US007608774B2

(12) United States Patent
Ohmura et al.

(10) Patent No.: US 7,608,774 B2
(45) Date of Patent: Oct. 27, 2009

(54) PERFORMANCE GUIDE APPARATUS AND PROGRAM

(75) Inventors: Hiroko Ohmura, Hamamatsu (JP); Takeshi Fuse, Tokyo (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 11/377,831

(22) Filed: Mar. 16, 2006

(65) Prior Publication Data

US 2006/0207411 A1 Sep. 21, 2006

(30) Foreign Application Priority Data

Mar. 17, 2005 (JP) ............................ 2005-077355
Mar. 29, 2005 (JP) ............................ 2005-095176

(51) Int. Cl.
*G10F 5/00* (2006.01)
*G09B 15/00* (2006.01)
*G09B 15/02* (2006.01)
*G10H 1/00* (2006.01)

(52) U.S. Cl. ................ 84/470 R; 84/464 R; 84/464 A; 84/477 R; 84/169

(58) Field of Classification Search .................. 84/169, 84/477 R, 464 R, 464 A, 470 R, 478
See application file for complete search history.

(56) References Cited

U.S. PATENT DOCUMENTS 5,907,115 A * 5/1999 Matsunaga et al. ........ 84/477 R
6,087,577 A * 7/2000 Yahata et al. ............ 84/477 R
6,410,836 B2 * 6/2002 Takahashi .................... 84/478
2002/0134216 A1 * 9/2002 Shibukawa ............... 84/477 R

FOREIGN PATENT DOCUMENTS

JP 2000-81882 A 3/2000
JP 2002-372967 A 12/2002

* cited by examiner

*Primary Examiner*—Lincoln Donovan
*Assistant Examiner*—Andrew R Millikin
(74) *Attorney, Agent, or Firm*—Rossi, Kimms & McDowell, LLP

(57) ABSTRACT

Two-dimensional display section is provided near a keyboard, and, in accordance with performance data, this display section is caused to effect a dynamic display moving, in a given two-dimensional trajectory, from a first display position corresponding to a key to be currently depressed to a second display position corresponding to another key to be next depressed. Thus, a human player can readily intuitively predict the key to be next depressed and depression timing of the next key, in accordance with the display drawing a so-called bouncing-ball-like two-dimensional trajectory that appears as if a ball were bouncing. Further, with a performance guide by the non-conventional or novel bouncing-ball-like two-dimensional trajectory display, the human player can enjoy continuing to play the keyboard, without getting bored, as if the player were following a bouncing ball.

2 Claims, 8 Drawing Sheets

PERFORMANCE GUIDE APPARATUS AND PROGRAM

BACKGROUND OF THE INVENTION

The present invention relates generally to performance guide apparatus and programs which, in a performance of an electronic keyboard instrument, visually indicate, to a human player, information necessary for the keyboard instrument performance, such as keys to be depressed and respective depression timing of the keys. More particularly, the present invention relates to an improved performance guide apparatus and program for providing a visual performance guide display that not only allows a human player to intuitively predict with ease each key to be next depressed and depression timing of the key but also is enjoyable to see so that the human player can enjoy playing the keyboard instrument.

Performance guide apparatus and programs have been known which visually indicate, to a human player who plays an electronic musical instrument provided with a keyboard as a performance operator section (i.e., electronic keyboard instrument), each key to be depressed (i.e., each position to be operated on the keyboard) and depression timing of the key. Various types of such performance guide apparatus for visually indicating, to a human player, keys to be depressed and respective depression timing of the keys have been proposed, an example of which is disclosed in Japanese Patent Application Laid-open Publication Nos. 2000-081882 or 2002-372967. In the performance guide apparatus disclosed in the No. 2000-081882 publication, a display device, having a linear array of a plurality of display elements (e.g., LEDs) provided in corresponding relation to the keys of the keyboard, is disposed near the keyboard; such a display device will hereinafter be referred to as "linear display device" for convenience of description. In the disclosed performance guide apparatus, the display elements corresponding to the keyboard keys are sequentially illuminated and deilluminated (i.e., turned on and off) in accordance with predetermined performance timing.

Further, in the performance guide apparatus disclosed in the No. 2002-372967 publication, a display device, having a plurality of display members provided in corresponding relation to the keys of the keyboard (such as rectangular liquid crystal display members with their respective lengths extending in the longitudinal direction of the corresponding keys, or display member comprising a plurality of display elements arranged or arrayed in the longitudinal direction of the corresponding keys), is disposed near the keyboard; such a display device will hereinafter be referred to as "planar display device" for convenience of description. In the disclosed apparatus, a performance guide is provided by scrolling the display on the display member, corresponding to the key to be depressed, in the longitudinal direction of the key in accordance with performance timing of that key to thereby visually indicate depression timing of the key.

However, with the first-mentioned conventional performance guide by the linear display device having the plurality of linearly-arranged display elements, the display elements, disposed at positions corresponding to the keys to be depressed, are merely illuminated in accordance with the depression timing, and thus, it is difficult for the human player to know in advance each key to be next depressed and depression timing of the key. Consequently, performance operation by the human player tends to become discrete and clumsy or unsmooth operation, like a "whack-a-mole game", where the human player merely depresses each key to be next depressed in accordance with the illumination of the corresponding display element. Thus, the conventional performance guide would present the problem that performance operation by the human player can hardly become smooth and can not improve satisfactorily. The second-mentioned conventional performance guide by the planar display device having the plurality of display members is advantageous in that the human player can easily know in advance each key to be next depressed and depression timing of the key, but this performance guide would present the inconvenience that, because only scrolling the display tends to be very boring and unenjoyable, it is extremely difficult to allow the human player, such as a child or beginner in particular, to enjoy playing the keyboard with interest for a considerably long time.

Further, because the aforementioned conventional performance guide technique via the linear display device or planar display device merely indicates the key to be next depressed and depression timing of the key, it is difficult from the conventional performance guide technique to provide a clear visual performance guide display for a special rendition style, such as cross-under-fingering, cross-over-fingering or approach-fingering, that is performance operation intended to achieve a smoother performance.

SUMMARY OF THE INVENTION

In view of the foregoing, it is an object of the present invention to provide an improved performance guide apparatus and program which can provide a human player with an easy-to-follow guide display of information necessary for a keyboard performance, such as keys to be depressed and depression timing of the keys. More specifically, the present invention seeks to provide a performance guide apparatus and program which can effect a guide display of information necessary for a keyboard performance, including information of not only an ordinary rendition style but also a special rendition style such as cross-under-fingering, cross-over-fingering or approach-fingering, by dynamically drawing a given two-dimensional trajectory from a position corresponding to a key to be currently depressed to another position corresponding to another key to be next depressed.

In order to accomplish the above-mentioned object, the present invention provides an improved performance guide apparatus, which comprises: a performance operation section including a plurality of performance operators; a two-dimensional display section provided near the performance operation section; an acquisition section that acquires performance data; and a display control section that, in accordance with the acquired performance data, controls a display on the two-dimensional display section so as to indicate each of the performance operators to be operated in accordance with a progression of a performance. In accordance with the passage of time, the display control section causes the two-dimensional display section to effect a dynamic visual display moving, in a given two-dimensional trajectory, from a first display position corresponding to the performance operator to be currently depressed to a second display position corresponding to the performance operator to be next depressed.

The two-dimensional display section is provided near the operator section that is in the form of, for example, a keyboard, and, in accordance with the acquired performance data, the display on this display section is controlled so as to indicate each of the performance operators to be operated in accordance with a progression of a performance. In accordance with the passage of time, the display control section causes the two-dimensional display section to effect a dynamic visual display moving, and in a given two-dimensional trajectory, from a first display position corresponding to the performance operator to be currently depressed to a second display position corresponding to the performance operator to be next depressed. In this way, a human player can intuitively predict with ease the key to be next depressed and depression timing of the next key, by following the visual display that, for example, draws a so-called bouncing-ball-like two-dimensional trajectory appearing as if a ball were bouncing. Further, with the performance guide display by the non-conventional or novel bouncing-ball-like two dimensional trajectory display, the human player can enjoy playing the keyboard for a considerably long time, without getting bored, as if the player were following a bouncing ball.

According to another aspect of the present invention, there is provided a performance guide apparatus which comprises: a performance operation section including a plurality of performance operators; a two-dimensional display section provided near the performance operation section; an acquisition section that acquires performance data; a determination section that, on the basis of the performance data acquired by the acquisition section, determines a performance style based on at least one of cross-under-fingering, cross-over-fingering and approach-fingering rendition styles a first display control section that controls the two-dimensional display section to display a performance operator corresponding to at least one of a reference finger, fixed finger and moving finger, specified in accordance with the performance style determined by the determination section, in a display style different from a display style of a performance operator that is to be next operated according to another performance style based on another rendition style than the at least one rendition style; and a second display control section that, in accordance with the acquired performance data, controls the two-dimensional display section to indicate a performance operator to be operated in accordance with predetermined operation timing. The second display control section controls the two-dimensional display section to draw a given two-dimensional trajectory that, in accordance with passage of time, moves to a performance operator to be next operated.

Such arrangements can provide the human player with clear performance guide displays for special rendition styles, such as cross-under-fingering, cross-over-fingering and approach-fingering rendition styles, that are each performance operation intended for a smoother performance. Particularly, by effecting a performance guide display with a given two-dimensional trajectory, the present invention can provide clear performance guide displays for special rendition styles, such as cross-under-fingering, cross-over-fingering and approach-fingering.

The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the objects and other features of the present invention, its preferred embodiments will be described hereinbelow in greater detail with reference to the accompanying drawings, in which:

FIGS. 6A-6D are conceptual diagrams showing several other examples of the performance guide display on the planar display section, of which FIG. 6A shows a guide display style in which the performance guide is displayed with a bouncing length or height varied in accordance with an interval, FIG. 6B shows another guide display style in which the performance guide is displayed with the bouncing height varied in accordance with depression intensity of a next key, FIG. 6C shows still another guide display style in which the performance guide is displayed with a height of a bounce-landing point varied in accordance with depression intensity of a next key and FIG. 6D shows still another guide display style in which the performance guide is displayed with a shape of each trajectory varied in accordance with a rendition style applied between current and next keys;

DETAILED DESCRIPTION OF THE INVENTION

Figure 1:
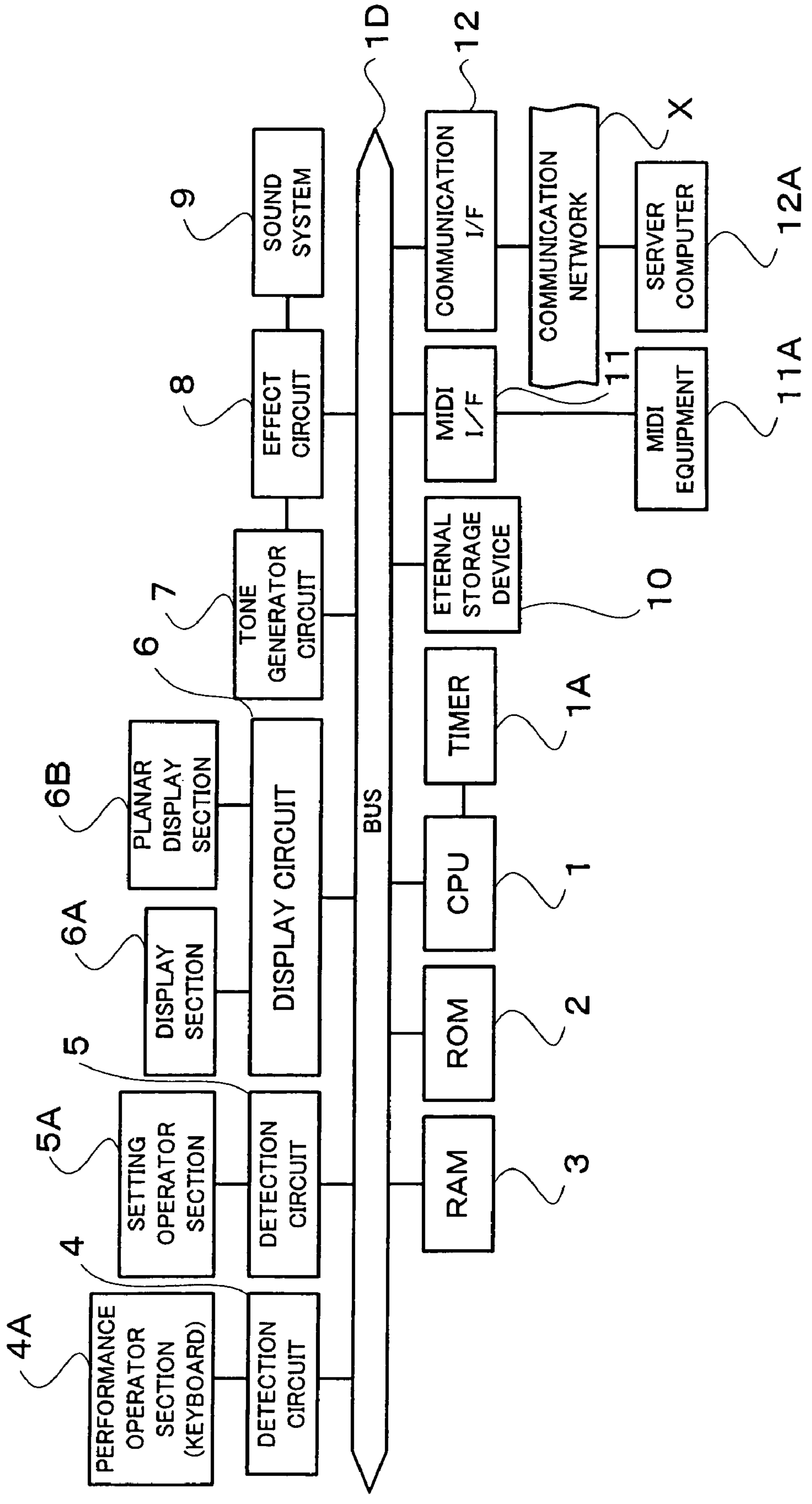
FIG. 1 is a block diagram showing an example general hardware setup of an electronic keyboard instrument to which is applied a performance guide apparatus in accordance with an embodiment of the present invention.

FIG. 1 is a block diagram showing an example general hardware setup of an electronic keyboard instrument to which is applied a performance guide apparatus in accordance with an embodiment of the present invention. This electronic keyboard instrument is controlled by a microcomputer comprising a microprocessor unit (CPU) 1, a read-only memory (ROM) 2 and a random-access memory (RAM) 3. The CPU 1 controls behavior of the entire electronic keyboard instrument. To the CPU 1 are connected, via a data and address bus 1D, the ROM 2, RAM 3, detection circuits 4 and 5, display circuit 6, tone generator (T.G.) circuit 7, effect circuit 8, external storage device 10, MIDI interface (I/F) 11 and communication interface 12. Also connected to the CPU 1 is a timer 1A for counting various time periods and intervals, for example, to signal interrupt timing for timer interrupt processes. For example, the timer 1A generates clock pulses, which are given to the CPU 1 as processing timing instructions or as interrupt instructions. The CPU 1 carries out various processes, such as performance guide processing, in accordance with such instructions.

The ROM 2 has prestored therein various programs to be executed by the CPU 1 and various data. The RAM 3 is used as a working memory for temporarily storing various data generated as the CPU 1 executes a predetermined program, as a memory for storing the currently-executed program and data related thereto, and for various other purposes. Predetermined address regions of the RAM 3 are allocated to various functions and used as registers, flags, tables, memories, etc. Performance operator section 4A is, for example, in the form of a keyboard having a plurality of keys for designating pitches of tones to be generated and a plurality of key switches provided in corresponding relation to the keys. The performance operator section (e.g., keyboard) 4A can be used not only in a manual performance by a user or human player, but also as means for setting various performance parameters, such as those related to tone colors and effects to be used in the electronic keyboard instrument, input means for selecting performance data to be subjected to the performance guide processing (i.e., performance data for which a visual performance guide is to be provided), etc. The detection circuit 4 detects depression and release of the keys on the performance operator section 4A to thereby produce corresponding detection outputs. Setting operator (e.g., switch) section 5A includes, for example, parameter setting switches for setting various performance parameters to be used in a manual performance etc., performance guide setting switches for determining whether or not to effect a visual performance guide, data selection switches for selecting performance data to be subjected to the performance guide processing (i.e., performance data for which a visual performance guide is to be provided), and part selection switches for selecting a performance part to be subjected to the performance guide processing (e.g., from among a right-hand performance part, left-hand performance part, etc.). The performance operator section 5A may of course include various other operators, such as a numerical-value-data inputting key pad and letter (or character)-data inputting keyboard operable to select, set and control a tone pitch, tone color, effect and the like and a mouse for manipulating a predetermined pointing device displayed on a display section 6A. The detection circuit 5 detects operating states of the above-mentioned switches and outputs switch information, corresponding to the detected operating states, to the CPU 1 via the data and address bus 1D.

The display circuit 6 visually displays, on the display section 6A that is, for example, in the form of a liquid crystal display (LCD) panel or CRT, types and current setting states of performance parameters, a list of performance data, musical scores of music pieces for which a visual performance guide is to be provided, controlling states of the CPU 1, and various other information. By referring to the various information displayed on the display section 6A, the user or human player can, for example, readily set various performance parameters to be used in a manual performance and select performance data of a music piece for which a visual performance guide is to be provided. Further, the display circuit 6 can control a display on a planar display section 6B, in addition to screen control of the above-mentioned display section 6A, to thereby provide a performance guide. Namely, in the instant embodiment, the planar display section 6B is used as a display device for guide-displaying (i.e., displaying for performance guide purposes) information necessary for a keyboard performance, such as keys to be depressed and depression timing of the keys.

Figure 2:
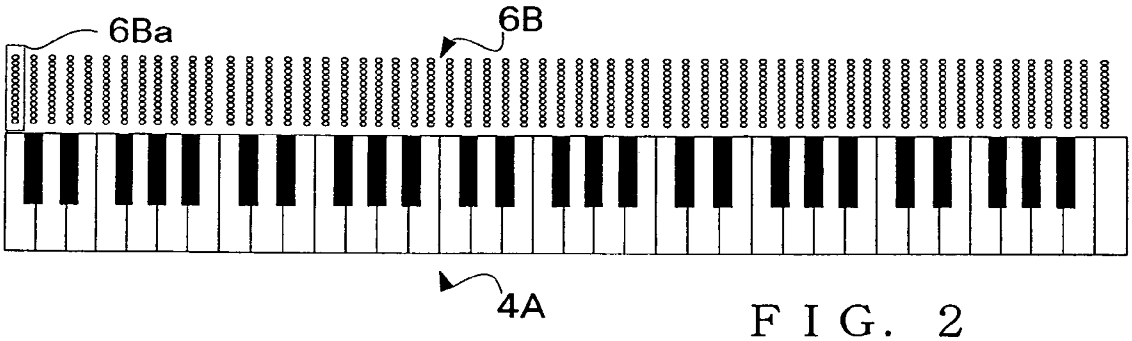
FIG. 2 is a conceptual diagram showing an example of a specific construction of a planar display section employed in the embodiment.

FIG. 2 is a conceptual diagram showing an example of a specific construction of the above-mentioned planar display section 6B. In the illustrated example, the planar display section 6B is a two-dimensional display comprising a plurality of display members (e.g., LED groups) 6Ba provided, for example, on a region of a panel immediately above the body of the keyboard 4A (in this case, a region adjacent to respective base portions of the keys) in corresponding relation to a plurality of the white and black keys of the keyboard 4A. Each of the display members (e.g., LED groups) 6Ba comprises a plurality of display elements (in this case, 12 (twelve) LEDs) arranged in a linear array in the longitudinal direction of the corresponding key. The planar display section 6B as a whole comprises a matrix of a multiplicity of LEDs. In the performance guide apparatus of the present invention, as will be later detailed, predetermined ones of the LEDs of the individual LED groups 6Ba are sequentially illuminated and deilluminated (i.e., turned on and off) at predetermined timing, to thereby provide a visual display where is dynamically drawn a so-called "bouncing-ball-like" two-dimensional trajectory (hereinafter also referred to simply as "trajectory display") appearing as though a ball were bouncing on the display section 6B. Namely, with the "bouncing-ball-like" two-dimensional trajectory display, the display section 6B guide-displays information necessary for a keyboard performance, such as keys to be depressed and depression timing of the keys, as will be later described in greater detail with reference to FIGS. 3-6. In this way, the trajectory display on the display section 6B provides a visual performance guide for assisting a manual performance by the human player.

Referring back to FIG. 1, the tone generator circuit 7, which is capable of simultaneously generating tone signals in a plurality of channels, receives, via the data and address bus 1D, various performance information generated in response to manipulation by the human player on the performance operator section 4A or various performance information generated on the basis of reproduction of performance data, and it generates tone signals based on the received performance information. The tone signals thus generated by the tone generator circuit 7 are audibly reproduced or sounded by a sound system 9, including an amplifier and speaker, after being imparted with desired effects via the effect circuit 8. The tone generator circuit 7, effect circuit 8 and sound system 9 may be constructed in any conventionally known manner. For example, any desired tone synthesis method may be used in the tone generator circuit 7, such as the FM, PCM, physical model or formant synthesis method. Further, the tone generator circuit 7 may be implemented by either dedicated hardware or software processing performed by the CPU 1.

The external storage device 10 is provided for storing various data, such as performance data (i.e., performance data files), as well as control-related data, such as various control programs to be executed by the CPU 1. Where a particular control program is not prestored in the ROM 2, the control program may be prestored in the external storage device (e.g., hard disk device) 10, so that, by reading the control program from the external storage device 10 into the RAM 3, the CPU 1 is allowed to operate in exactly the same way as in the case where the particular control program is stored in the program memory 2. This arrangement greatly facilitates version upgrade of the control program, addition of a new control program, etc. The external storage device 10 may comprise any of various removable-type media other than the hard disk (HD), such as a flexible disk (FD), compact disk (CD-ROM or CD-RAM), magneto-optical disk (MO) and digital versatile disk (DVD), or a semiconductor memory, such as a flash memory.

The MIDI interface (I/F) 11 is provided for inputting performance data of the MIDI format (i.e., MIDI data) from externally-connected other MIDI equipment 11A or the like to the electronic keyboard instrument, and for outputting performance data of the MIDI format (i.e., MIDI data) from the electronic keyboard instrument to the other MIDI equipment 11A or the like. The other MIDI equipment 11A may be one provided with an operator section of any type (or operating type), such as the keyboard type, stringed instrument type, wind instrument type, percussion instrument type or body-attachable type, as long as it can generate MIDI data in response to operation by a user or human player of the equipment. The MIDI interface 11 may be a general-purpose interface rather than a dedicated MIDI interface, such as RS-232C, USB (Universal Serial Bus) or IEEE1394, in which case other data than MIDI event data may be communicated (i.e., transmitted and received) at the same time. In the case where any one of the above-mentioned general-purpose interfaces is used as the MIDI interface 11, the other MIDI equipment 11A may be arranged to communicate other data than MIDI event data. Of course, the performance data may be in any other format than the MIDI format, in which case the MIDI interface 11 and other MIDI equipment 11A are constructed in conformity with the data of the other format. The communication interface (I/F) 12 is an interface connected to a wired or wireless communication network X, such as a LAN, the Internet, telephone line network, etc., via which it can be connected to a desired server computer 12A to receive various desired control programs and data from the server computer 12A. Namely, where any control program or data is not stored in the ROM 2 or external storage device (e.g., hard disk) 10, the communication interface 12 is used to download the control program or data from the server computer 12A. It should be appreciated that the communication interface 12 may be of either or both of wired and wireless types.

Furthermore, the electronic keyboard instrument of the present invention is not limited to the type where the performance operator section 4A, display section 6A, tone generator circuit 7, etc. are incorporated together within the body of the electronic keyboard instrument; for example, the electronic keyboard instrument may be constructed such that the above-mentioned components are provided separately and interconnected via communication facilities, such as a MIDI interface, various networks and/or the like. Moreover, the electronic keyboard instrument of the present invention may be applied to any desired types of apparatus or equipment other than electronic keyboard instruments as described above, such as personal computers, karaoke apparatus, game apparatus, portable telephones or portable communication terminals like PDAs. Further, the present invention may be applied to mechanical pianos provided with a string striking mechanism combined with a performance data reproducing device, without being limited to electronic musical instruments that electronically generate tones. Particularly, the present invention is suitable for application to player pianos having a performance data reproducing device incorporated therein. Such apparatus or equipment, like portable communication terminals, connected to communication networks need not have their function completed by themselves, and the present invention is suited to applications where a visual performance guide is provided by receiving performance data through download or streaming-reproduction from a server computer.

First Embodiment

Figure 3A:
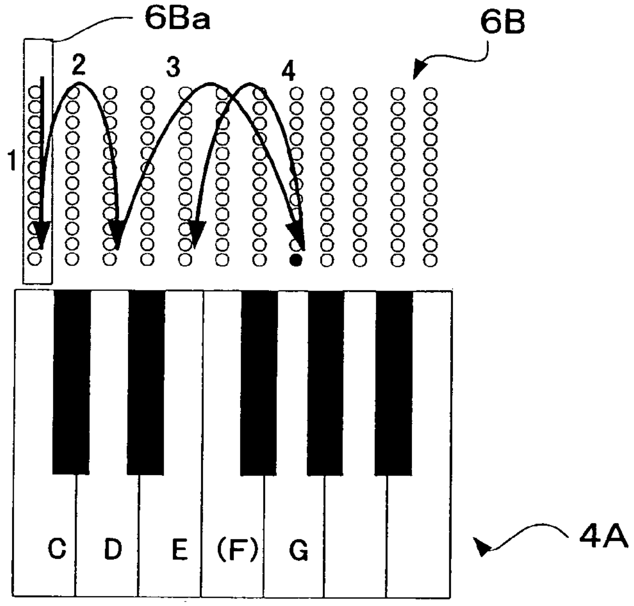
FIG. 3A is a conceptual diagram showing an example performance guide display on the planar display section.
Figure 3B:
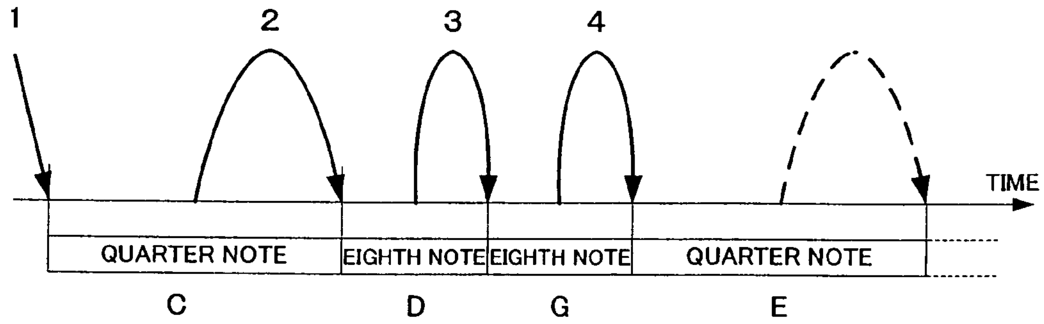
FIG. 3B is a diagram showing variation over time of the performance guide display.

Next, a description will be made about a specific example of the performance guide display on the planar display section 6B shown in FIG. 2, with reference to FIGS. 3A and 3B. FIG. 3A is a conceptual diagram showing an example performance guide display on the planar display section 6B, and FIG. 3B shows variation over time of the performance guide display. In order to facilitate understanding, the performance guide display is described below in relation to a case where the performance guide display is effected to indicate that keys corresponding to pitches “C”, “D”, “G” and “E” are to be depressed by the human player sequentially in the mentioned pitch order of “C”→“D”→“G”→“E”. Note that arrows in the figures indicate a manner in which a dynamic performance guide display (i.e., display dynamically indicating or drawing a given two-dimensional trajectory) by illumination of LEDs is varied over time to instruct the human player to sequentially depress the keys in the pitch order of “C”→“D”→“G”→“E”. Numbers “1” to “4” attached to the arrows indicate the order in which variation or shift in the performance guide indication occurs. Namely, in the illustrated example, the performance guide indication for the key corresponding to the pitch “C”, responsive to a start of a keyboard performance, is represented by the arrow represented by the number “1” (namely, arrow “1”), the performance guide indication shift from the pitch “C” to the next pitch “D” is represented by arrow “2”, the performance guide indication shift from the pitch “D” to the next pitch “G” is represented by arrow “3”, and the performance guide indication shift from the pitch “G” to the next pitch “E” is represented by arrow “4”.

In the case where the performance guide display is to be effected to instruct the human operator to sequentially depress the keys in the pitch order of “C”→“D”→“G”→“E” as illustrated in FIG. 3A, the performance guide indication is first performed for the key of the pitch “C” by illuminating and deilluminating the individual LEDs of the corresponding LED group 6Ba sequentially downwardly (i.e., in the downward direction in the figure), starting with an upper-located LED of the LED group 6Ba (the upper-located LED may be either the uppermost LED (i.e., LED at the uppermost position of the LED group 6Ba) remotest from the corresponding key or any other LED located partway down the length of the LED group 6Ba (i.e., intermediate LED located closer to the corresponding key than the uppermost LED)), in such a manner that the display by the LED illumination sequentially descends along the length of the LED group 6Ba until the lowermost LED closest to the corresponding key is illuminated at predetermined depression timing of the key of the pitch “C”, as indicated by arrow “1”. Next, as indicated by arrow “2”, the performance guide indication is effected for the key of the pitch “D” by first illuminating and deilluminating, prior to depression timing of the key of the “pitch D”, predetermined LEDs of the LED group 6Ba corresponding to the previous key of the pitch “C”, sequentially upwardly, to an intermediate LED located partway up the length of the LED group 6Ba, then causing the LED illumination display to jump, by way of the LED group 6Ba corresponding to the key of the pitch “C#(D♭)”, to the LED group 6Ba corresponding to the key of the pitch “D” so as to illuminate and deilluminate predetermined LEDs of the LED group 6Ba corresponding to the key of the pitch “D” sequentially downwardly, starting with an intermediate one of the LEDs, in such a manner that the LED illumination display sequentially descends from the intermediate LED along the length of the LED group 6Ba until the lowermost LED of the LED group 6Ba, closest to the corresponding key, is illuminated at depression timing of the key of the pitch "D". Namely, the performance guide display is performed here by sequentially controlling the illumination states of the LEDs, in accordance with the passage of time, to dynamically draw a given two-dimensional trajectory as illustrated in the figure (in this case, each trajectory is in the shape of a parabolic curve), which indicates the display by the LED illumination shifting in such a manner that it first moves to a position closest to the key of the pitch "C" to be currently depressed, then moves away from that position and then moves to a position close to the key of the pitch "D" to be next depressed. After that, the performance guide display is effected, in a similar manner to the above-mentioned, for the other keys of the pitches "G" and "E" by illuminating predetermined LEDs of the corresponding LED groups so as to dynamically draw a given two-dimensional trajectory as indicated by arrows "3" and "4", respectively. In this way, the performance guide display is effected in the embodiment by dynamically drawing a given two-dimensional trajectory (which, in this case, is a parabolic curve) appearing as though a ball were bouncing at generally the same maximum height from one key to be currently depressed to another key to be next depressed. With the trajectory displayed in a symmetric curve (e.g., parabolic curve) as illustrated, the human player can intuitively predict with ease an approximate position of each key to be next depressed, on the basis of a half-drawn trajectory, even before the LED illumination display reaches the key to be next depressed.

As set forth above, the performance guide apparatus of the present invention adjusts or controls illumination states of the individual LEDs on the planar display section 6B to provide a visual performance guide by a display that dynamically draws a so-called "bouncing-ball-like" two-dimensional trajectory (or "bouncing display") appearing as if a ball were bouncing. However, if the time length of the bouncing trajectory display, appearing as if a ball were bouncing from the key to be currently depressed (i.e., current key) to the key to be next depressed (i.e., next key), is too short, the human operator may fail to accurately follow the bouncing display so that his or her operation on the keyboard may not be executed in time. Thus, when the note length of the current key is long, the bouncing display is performed for as long a time as possible, using a predetermined trajectory function such that the bouncing display time length (i.e., length in the time-axis direction) from the current key to the next key can be made proportional to the note length of the current key. In the case where the performance guide display is performed so that the keys are depressed in the pitch order of "C"→"D"→"G"→"E" as illustrated in FIG. 3B, and if "C" and "E" are each a quarter note having a relatively long note length and "D" and "G" are each an eighth note having a relatively short note length, the performance guide display is effected, in the embodiment, in such a manner that the time length of the bouncing display from the pitch "C" of the longer note length to the pitch "D" as indicated by arrow 2 and the time length of the bouncing display from the pitch "E" of the longer note length to a succeeding pitch (not shown) as indicated by a dotted-line arrow are longer than the time length of the bouncing display from the pitch "D" of the shorter note length to the pitch "G" as indicated by arrow 3 and the time length of the bouncing display from the pitch "G" of the shorter note length to the pitch "E" as indicated by arrow 4. Thus, where the note length is long, the human player can visually confirm a shift to the next key in good time. Note that the above-mentioned trajectory function may be either a linear function such that the note length and the time length of the bouncing display can be made proportional to each other, or a nonlinear function.

Preferably, the LED that becomes a landing point of the above-mentioned bouncing display, i.e. the lowermost LED of the LED group 6Ba corresponding to the key to be next depressed, is indicated in advance in a different display style (e.g., in a different color or different brightness) from the above-mentioned display drawing in advance a two-dimensional bouncing trajectory; the different display style may be blinking of the LED. For example, when the performance guide indication is to be effected for the section from the key of "D" to the key of "G" as indicated by arrow "3" in the illustrated example of FIG. 3A, the lowermost LED of the LED group 6Ba corresponding to the key of "G" may be illuminated in advance (indicated in the figure by a small circle painted in black) to previously indicate that the illuminated lowermost LED represents a landing point for a key to be next depressed and depression timing of the key.

Only one of the LEDs falling on the two-dimensional trajectory path may be illuminated at a time or simultaneously, but, if it is likely that the trajectory to be dynamically drawn will not be displayed smoothly with only one LED illuminated at a time, two or more adjoining ones of the LEDs falling on the trajectory path may be illuminated simultaneously to permit a smoother trajectory display. In this case, the two or more LEDs to be illuminated simultaneously need not necessarily be in the same display style (e.g., same brightness).

Figure 4:
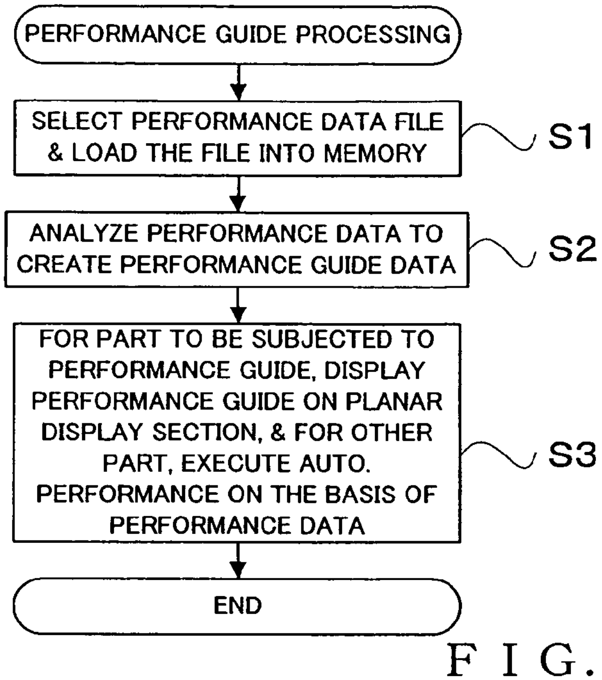
FIG. 4 is a flow chart showing an example operational sequence of performance guide processing performed in the embodiment.

With reference to FIG. 4, the following paragraphs describe the "performance guide processing" for effecting, on the planar display section 6B, a display (bouncing display) that draws a given bouncing-ball-like two-dimensional trajectory as explained above in order to provide a visual performance guide for a keyboard performance. FIG. 4 is a flow chart showing an example operational sequence of the "performance guide processing".

At step S1, a performance data set or file of a music piece for which a visual performance guide is to be provided is selected in response to operation, by the human player, of any of the data selection switches, and the thus-selected performance data file is read out from the external storage device 10 or the like loaded into a memory, such as the RAM 3. At step S2, the read performance data file is analyzed so as to create a performance guide data set (not shown). The performance guide data set is created to cover the entire music piece (i.e., all notes of the music piece) for a particular performance part to be subjected to the performance guide, and the performance guide data set comprises two different kinds of data: trajectory display data; and advance indication data. The trajectory display data include various data stored in corresponding relation to all of the notes included in the performance part to be subjected to the performance guide and in accordance with the passage of a performance time of the music piece in question, and the various data include data indicative of a start point position and display shift start timing of the given two-dimensional trajectory, an end point position and shift end timing of the given two-dimensional trajectory, particular kind of a trajectory function to be used to effect the display that dynamically draw the given two-dimensional trajectory (such as a triangular waveform, parabolic curve, elongated semiellipse; the trajectory function data is used only in a case where the trajectory shape is to be varied, during the guide, from a default shape as will be later described), parameters of the trajectory function (such as a bouncing height; the trajectory function parameter data is used only in a case where the bouncing height is to be varied from a default height). Namely, the trajectory display data are data for dynamically drawing the given two-dimensional trajectory that moves from a position corresponding to a key to be currently depressed to a position corresponding to a key to be next depressed. The advance indication data, on the other hand, include various other data stored in corresponding relation to the notes included in the performance part to be subjected to the performance guide and in accordance with the passage of a performance time of the music piece in question, and the various other data include data indicative of a position, display start timing and display end timing of each advance indication. Namely, the advance indication data are data for indicating in advance a position of each key to be next depressed. Operations for creating such performance guide data will be later described in detail with primary reference to FIG. 5.

At step S3, the visual performance guide is displayed on the planar display section 6B, on the basis of the created performance guide data, for the performance part for which an instruction for providing the performance guide has been given by the user (i.e., performance part to be subjected to the performance guide). Namely, first, on the basis of the advance indication data, the LED corresponding to the position to be indicated in advance is first illuminated, in accordance with the display start timing, in a different display style from the trajectory display. Then, on the basis of the trajectory display data, the LED corresponding to the trajectory start point position is illuminated in accordance with the shift start timing. Then, LEDs, provided at positions corresponding to coordinate positions calculated by trajectory function calculations are sequentially illuminated in accordance with the passage of time; in this case, the last-illuminated LED may be deilluminated in response to illumination of one particular LED. Then, the display style of the LED corresponding to the end point position having been indicated in advance is changed to agree with the display style of the trajectory display. In this manner, the performance guide display is effected, on the basis of the above-mentioned trajectory display data, for the performance part for which the instruction for providing the performance guide has been given, while an automatic performance is executed, on the basis of the corresponding performance data, for each other performance part for which no instruction for providing the performance guide has been given. As a consequence, the human player can appropriately perform key operation on the keyboard to an automatic performance for a desired performance part of a desired music piece by following the performance guide display based on the given two-dimensional trajectory dynamically drawn on the planar display section 6B.

Figure 5:
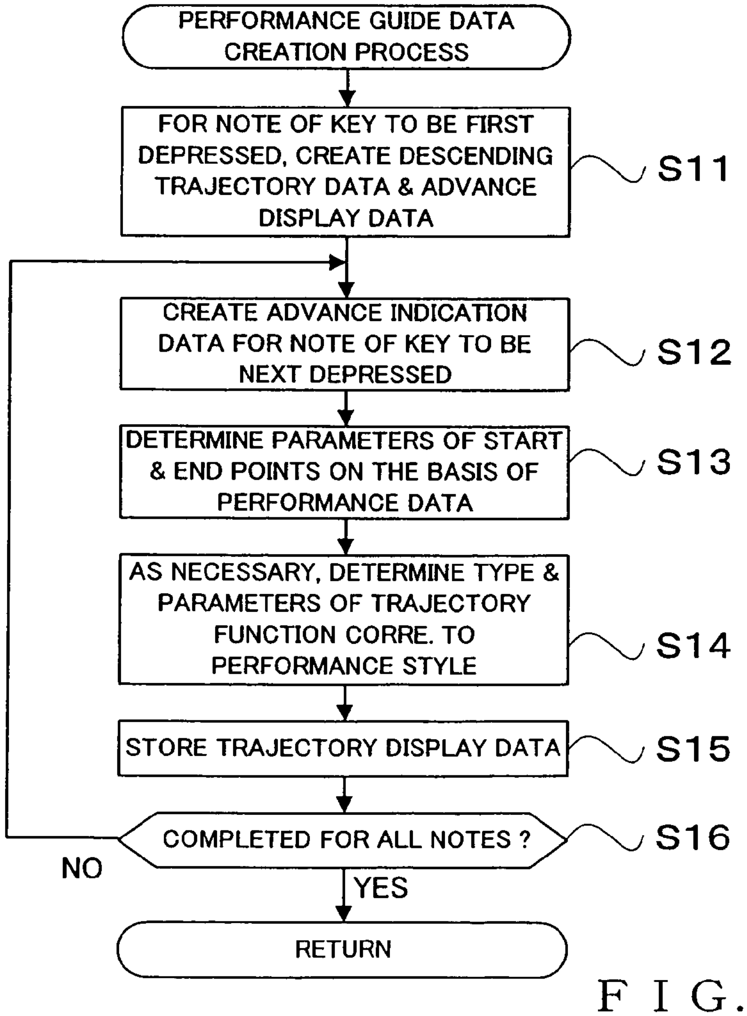
FIG. 5 is a flow chart of an example operational sequence of a performance guide data creation process carried out in the performance guide processing.

Further, the following paragraphs describe a "performance guide data creation process" carried out in the "performance guide processing" (see step S2 of FIG. 4). FIG. 5 is a flow chart of an example operational sequence of the "performance guide data creation process". To facilitate understanding, the description will be made, in relation to the case where the keys corresponding to the pitch order of "C"→"D"→"G"→"E" are sequentially depressed (see FIG. 3A).

At step S11, trajectory display data representative of a descending trajectory and advance indication data are created and stored for the note of the key to be first depressed. Namely, trajectory display data to display a trajectory indicated by arrow "1" of FIG. 3A and advance indication data to indicate in advance the key corresponding to the pitch "C", to be first depressed, are created as data of a guide indication to be provided at the beginning of a performance. At next step S12, advance indication data is created to indicate in advance the key corresponding to the pitch (e.g., pitch "D") to be next depressed. At following step S13, parameters of the trajectory start point position and trajectory end point position are determined on the basis of the performance data. Then, at next S14, a type and parameters of the trajectory function corresponding to a performance style are determined as necessary. As will be later described in detail, the type of the trajectory function is determined only when the shape of the trajectory is to be changed from the default shape (see FIG. 6D to be explained later), and the parameters of the trajectory function are determined only when the peak height of the trajectory is to be changed from the default peak height (see FIGS. 6A-6C to be explained later). At next step S15, the trajectory display data and advance indication data (i.e., performance guide data) created in the above-described manner are stored in memory. In the above-described manner, the display style of the trajectory to be displayed is determined in accordance with the performance style of the keys to be depressed currently and next, and performance guide data to effect a performance guide display in the determined display style are created. At following step S16, a determination is made as to whether the aforementioned operations have been completed for all of the notes in the selected performance data file. If it is determined that the aforementioned operations have been completed for all of the notes in the selected performance data file (YES determination at step S16), the instant performance guide data creation process is brought to an end. If, on the other hand, answered in the negative (NO determination at step S16), the process revert to step S12 to repeat the operations of steps S12-S16 above.

The performance guide display may be effected in any other suitable styles than the above-described style (see FIG. 3A), as illustratively set forth below. FIGS. 6A-6D are conceptual diagrams showing several other examples of the display style applicable to the planar display section 6B. These examples to will be described in relation to the case where the performance guide display is effected to instruct the human player to sequentially depress the keys corresponding to the pitch order of "C"→"D"→"G"→"E".

Figure 6A:
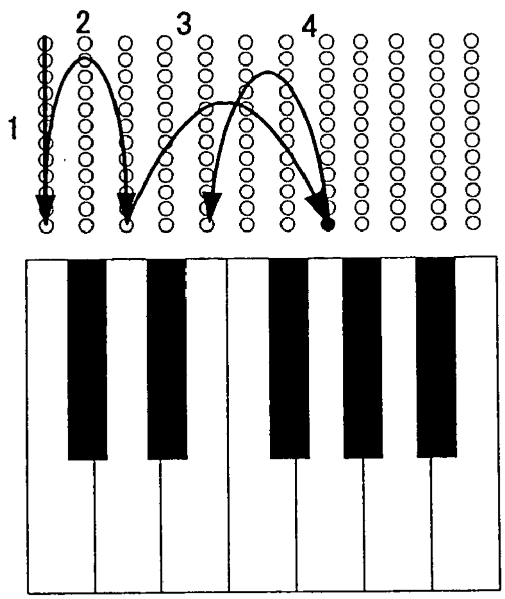

FIG. 6A shows an example guide display style in which the performance guide is displayed in such a manner that a bouncing height (or peak point), in the longitudinal direction of the key, of each bouncing trajectory is varied in accordance with an interval (i.e., pitch difference) between the current and next keys. The pitch difference is two semitones in the pitch shift section from "C" to "D" indicated by arrow "2", the pitch difference is five semitones in the pitch shift section from "D" to "G" indicated by arrow "3", and the pitch difference is three semitones in the pitch shift section from "G" to "E" indicated by arrow "4". Thus, the entire trajectory is displayed with bouncing heights corresponding to these pitch differences; in this case, the trajectory (more specifically, trajectory portion) for the pitch shift section from "C" to "D" is displayed with a greatest bouncing height, the trajectory for the pitch shift section from "G" to "E" is displayed with a medium bouncing height, and the trajectory for the pitch shift section from "D" to "G" is displayed with a smallest bouncing height; namely, relationship among the bouncing heights of the trajectories for the pitch shift sections may be expressed as "C→D>G→E>D→G". With such a trajectory display, the human player can roughly intuitively predict the key be next depressed, or a destination of the shift (i.e., destination key), on the basis of an ascending angle or peak point of the trajectory. Namely, if the ascending angle is near perpendicular to the longitudinal side edge of the keyboard and the peak point is high (i.e., remote from the corresponding key), then the human player can predict that the next or destination key is not very far in pitch from the key to be currently depressed, while, if the ascending angle is near parallel to the longitudinal side edge of the keyboard and the peak point is low (i.e., close to the corresponding key), the human player can predict that the destination key is far in pitch from the key to be currently depressed. Further, because the entire trajectory for the pitch shift sections is displayed as if it were bouncing to various peak points, the performance guide can be very enjoyable to see and never boring, so that even a child or beginner can enjoy playing the keyboard with interest for a considerably long time.

Figure 6B:
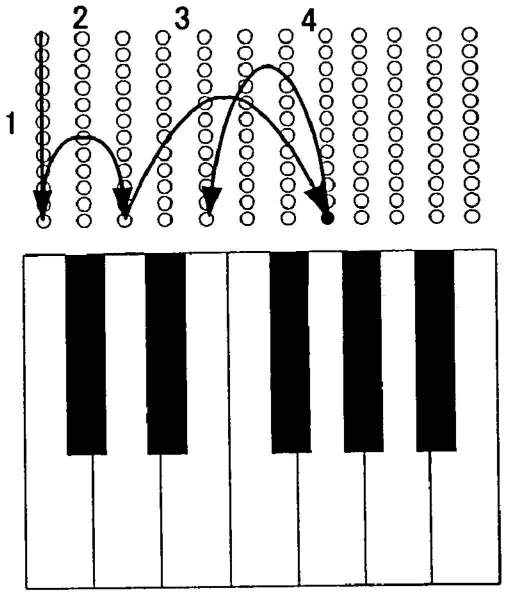

FIG. 6B shows another example guide display style in which the performance guide is displayed in such a manner that the bouncing height (or peak point) of each trajectory is varied in accordance with depression intensity (i.e., velocity) of the next key. If the key depression intensity is assumed to become greater in the order of "D"→"G"→"E" (i.e., "E">"G">"D"), the trajectory for the pitch shift section from "G" to "E" is displayed with a greatest bouncing height as indicated by arrow "4", the trajectory for the pitch shift section from "D" to "G" is displayed with a medium bouncing height as indicated by arrow "3", and the trajectory for the pitch shift section from "C" to "D" is displayed with a smallest bouncing height as indicated by arrow "2". With such a trajectory display, the human operator can intuitively predict, on the basis of the ascending angle and peak point of the trajectory, approximate depression intensity of the next or destination key or with what approximate degree of intensity the destination key should be depressed. Namely, if the ascending angle is near perpendicular to the longitudinal side edge of the keyboard and the peak point is high (i.e., remote from the corresponding key), the human player can predict that the destination key should be depressed with great intensity. Conversely, if the ascending angle is near parallel to the longitudinal side edge of the keyboard and the peak point is low (i.e., close to the corresponding key), then the human player can predict that the destination key should be depressed with small intensity. Further, because the entire trajectory for the pitch shift sections is displayed as if it were bouncing to various peak points, the performance guide can be very enjoyable to see. Needless to say, the bouncing height may be variably controlled in accordance with any other type of rendition style.

Figure 6C:
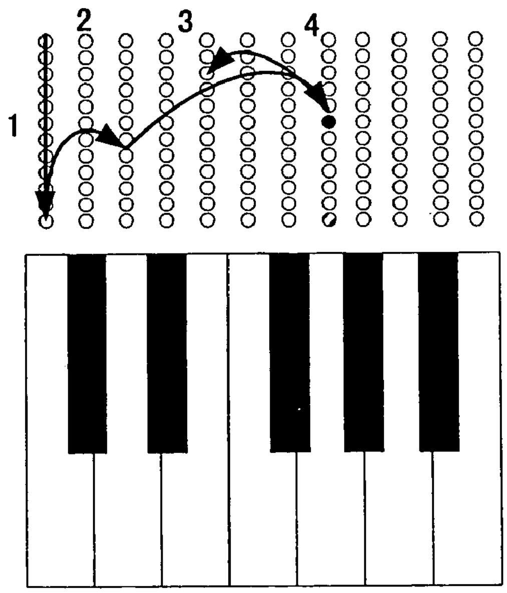

FIG. 6C shows still another example guide display style in which the performance guide is displayed in such a manner that the height of the bounce-landing point (corresponding to a position to be illuminated in accordance with key depression timing) of each bouncing trajectory is varied in accordance with depression intensity (i.e., velocity) of the next or destination key. If the key depression intensity is assumed to become greater in the order of "D"→"G"→"E" (i.e., "E">"G">"D"), the bounce-landing point of the trajectory for the pitch shift section from "G" to "E" is displayed with a greatest height as indicated by arrow "4", the bounce-landing point of the trajectory for the pitch shift section from "D" to "G" is displayed with a medium bouncing height as indicated by arrow "3", and the bounce-landing point of the trajectory for the pitch shift section from "C" to "D" is displayed with a smallest bouncing height as indicated by arrow "2". With such a trajectory display, the human operator is allowed to readily intuitively predict relationship among intensity levels of the notes. For example, in the case of a crescendo, the landing point becomes higher in position in a progressive or stepwise manner, while, in the case of a decrescendo, the landing becomes lower in a progressive or stepwise manner. With such a display style too, where the entire trajectory for the pitch shift sections is displayed as if it were bouncing to various peak points, the performance guide can be very enjoyable to see. Needless to say, the bouncing height may be variably controlled in accordance with any other type of rendition style.

With the display style of FIG. 6C, however, it may be difficult to see when the bouncing trajectory has reached the landing point, i.e. difficult to know accurate key depression timing at which the key should be actually depressed. Thus, it is preferable that the LED indicative of the destination or next key and depression timing of the key be illuminated in advance in another or different display style (e.g., in a different color or brightness) or illuminated in advance in a blinking fashion (see a small circle painted in black in the figure). Further, it is preferable that the lowermost LED of the LED group 6Ba corresponding to the destination or next key be also indicated in advance in still another display style (see a small hatched circle in the figure).

Figure 6D:
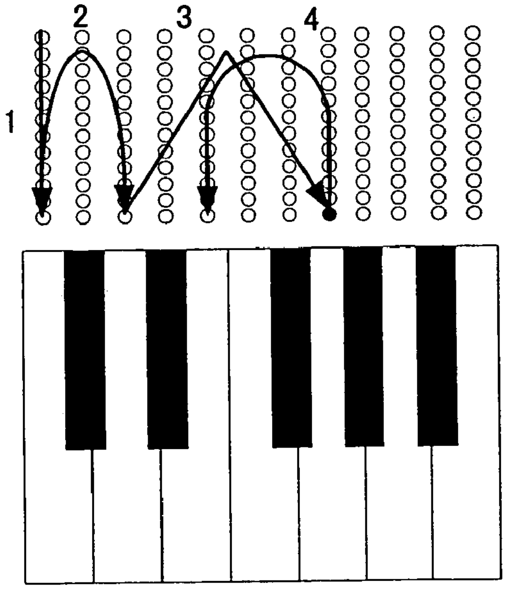

FIG. 6D shows still another example guide display style in which the performance guide is displayed in such a manner that the shape of each trajectory is varied in accordance with a performance or rendition style (such as a staccato, tenuto or ordinary rendition style) applied to the key to be currently depressed or the key to be next depressed, or between these current and next keys. For example, if an ordinary rendition style is applied to the pitch shift section from "C" to "D" indicated by arrow "2", the trajectory is displayed in a parabolic curve. Further, if a staccato-like rendition style is applied to the pitch shift section from "D" to "G" indicated by arrow "3", the trajectory is displayed in a triangular waveform. Further, if a tenuto-like rendition style is applied to the pitch shift section from "G" to "E" indicated by arrow "4", the trajectory is displayed in an elongated semiellipse. In particular, the display may be effected in such a manner that images or impressions of the performance and trajectory shape agree or resemble each other. Namely, in the illustrated example of FIG. 6D, a triangular waveform is used for a staccato that is a rendition style of a sharp image, and an elongated semiellipse is used for a tenuto that is a rendition style of a round image. With such a trajectory display, the human player can roughly intuitively predict a rendition style with ease. Further, because the entire trajectory is displayed as if it were bouncing in various shapes, the performance guide can be very enjoyable to see.

Second Embodiment

By dynamically drawing a given two-dimensional trajectory on the planar display section 6B of FIG. 2, the performance guide apparatus of the present invention can not only provide visual performance guides for ordinary rendition styles that are each ordinary performance operation as mentioned above, but also provide visual performance guides for special rendition styles, such as "cross-under-fingering", "cross-over-fingering" and "approach-fingering", that are each intended to achieve a smoother performance. Thus, the following paragraphs describe performance guide displays effected on the planar display section 6B for special rendition styles, such as cross-under-fingering, cross-over-fingering and approach-fingering, with primary reference to FIGS. 7, 8, 9A and 9B. To facilitate understanding, the performance guide displays will be described in relation to a case where a performance guide is provided for a right-hand performance.

Figure 7A:
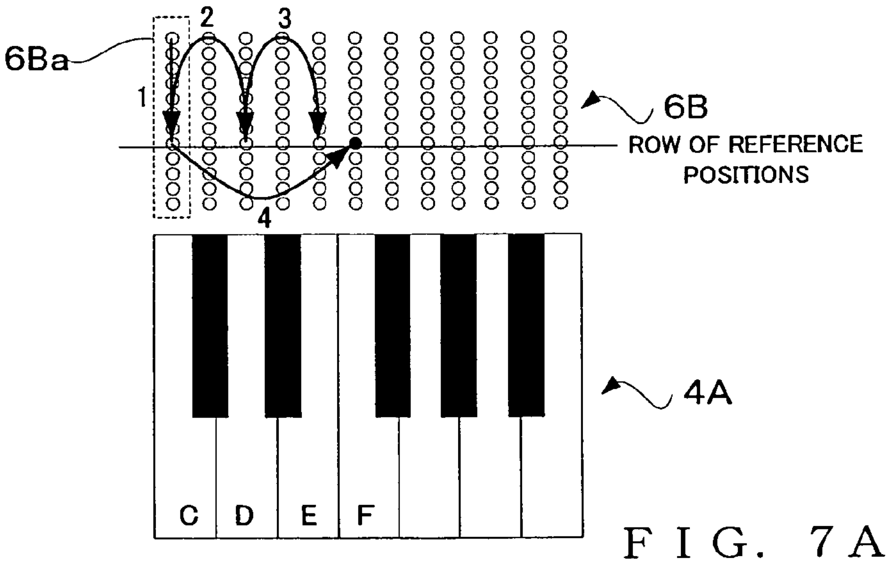
FIGS. 7A-7C are conceptual diagrams schematically showing examples of performance guide displays effected on the planar display section for special rendition styles.
Figure 7B:
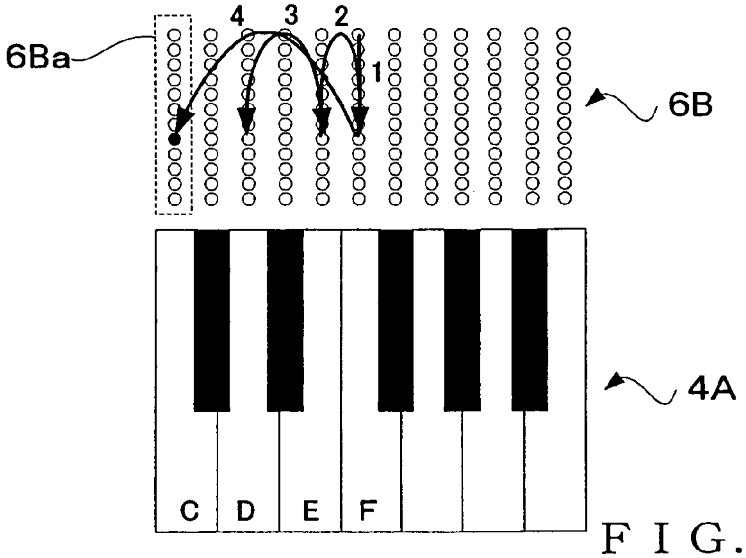
Figure 7C:
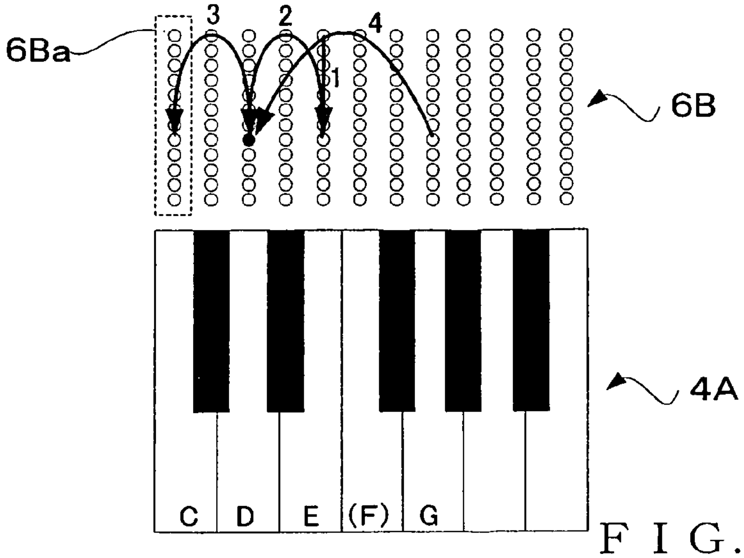

FIGS. 7A-7C are conceptual diagrams schematically showing examples of performance guide displays effected on the planar display section 6B for special rendition styles, such as cross-under-fingering, cross-over-fingering and approach-fingering. In the figures, various arrows indicate, for convenience of explanation, example manners in which the display by the LED illumination (i.e., display dynamically drawing a given two-dimensional trajectory) shifts to instruct depression of corresponding keys in predetermined order of a performance, and numbers "1" to "4" represent order in which the display shifts sequentially occur. The second embodiment is constructed in such a manner that, in providing a visual performance guide for a special rendition style such as cross-under-fingering, cross-over-fingering or approach-fingering, intermediate LEDs of the LED groups 6Ba corresponding to keys to be depressed (e.g., fifth LEDs from the bottom of the corresponding LED groups 6Ba, or LED at a fifth position from the bottom of each of the corresponding LED groups 6Ba) are illuminated in accordance with predetermined performance timing, instead of the lowermost LEDs of the corresponding LED groups 6Ba being illuminated in accordance with the predetermined performance timing. The fifth position from the bottom of the LED groups 6Ba will hereinafter be referred to as "reference position", and such reference positions of the individual LED groups 6Ba will be collectively referred to as "row of reference positions".

First, consider a case where a performance guide display is to be effected so as to instruct depression of keys, for example, in the pitch order of "C"→"D"→"G"→"E", as shown in FIG. 7A. Arrow indicated by the number "4" (i.e., arrow "4") in FIG. 7A represents a performance guide for "cross-under-fingering", and other arrows represent performance guides for ordinary rendition styles. Performance guide indication is first performed for the key of the pitch "C" by illuminating and deilluminating the individual LEDs of the corresponding LED group 6Ba sequentially downwardly, starting with an upper-located LED of the LED group 6Ba (the upper-located LED may be either the uppermost LED remotest from the corresponding key or any other LED located intermediate between the uppermost LED and the LED at the reference position (hereinafter "reference-position LED"), in such a manner that the display by the LED illumination sequentially descends along the length of the LED group 6Ba until the reference-position LED is illuminated at predetermined depression timing of the key of the pitch "C", as indicated by arrow "1". The key of the pitch "C" is depressed by the thumb. Types of the fingers to be used may be indicated on the other display section 6A, or by illuminating the LEDs in particular colors assigned to the individual fingers, or in any other suitable manner. Then, the performance guide indication is performed sequentially for the keys of the pitches "D" and "E" by sequentially controlling the illumination states of the corresponding LEDs, in accordance with the passage of time, to dynamically draw a given two-dimensional trajectory that first moves away from the reference position of the key to be currently depressed (i.e., from a position relatively close to the key to be currently depressed) and then moves to the reference position close to the key to be next depressed, as indicated by arrows "2" and "3". The keys of the pitches "D" and "E" are depressed by the index and middle fingers, respectively.

Then, as indicated by arrow "4", the performance guide indication is effected for the key of the pitch "F", to be subjected to "cross-under-fingering" rendition style operation, by sequentially controlling, prior to depression timing of the key of the pitch "F", the illumination states of the LEDs, located beneath the row of reference positions, of the LED groups 6Ba corresponding to the keys of the pitches "C", "C#(D♭)", "D", "D#(E♭)", "E" and "F". More specifically, the reference-position LED of the LED group 6Ba corresponding to the key of the pitch "C" is first illuminated, and then predetermined LEDs of the LED groups 6Ba corresponding to the keys of the pitches "C", "C#(D♭)", "D", "D#(E♭)", "E" and "F" are illuminated so as to dynamically draw a given two-dimensional trajectory that first descends away from the reference position of the LED groups 6Ba corresponding to the key of the pitch "C" and then moves upward to the reference-position LED of the LED group 6Ba corresponding to the key of the pitch "F", as indicated by arrow "4". Namely, in this case, the end position of the performance guide indication for the most-recently-operated (i.e., last-operated) key of the pitch "E" is not in succession with the start position of the performance guide indication for the key of the pitch "F" to be next depressed, and the performance guide display is effected by dynamically drawing a given two-dimensional trajectory which, in accordance with the passage of time, moves downwardly away from the reference position corresponding to the key of the pitch "C", last operated with the thumb that is to be subjected to cross-under-fingering operation, toward the reference position corresponding to the key of the pitch "F" to be next depressed. Thus, the two-dimensional guiding trajectory, moving below (i.e., in the figure, along a region lower than ) the row of reference positions, can indicate, in a manner easy to visually follow, that the key depression operation is to be performed with a "cross-under-fingering" rendition style where the finger to be used for depressing the key to be next depressed should be caused to pass under another finger.

When a performance guide display is to be effected to instruct depression of keys, for example, in the pitch order of "F"→"E"→"D"→"C", as shown in FIG. 7B, arrow "4" represents a performance guide for "cross-over-fingering". To provide the visual performance guide for the keys of the pitches "F", "E" and "D" as represented by arrows "1", "2" and "3", the LED illumination states of the corresponding LED groups 6Ba are controlled so as to dynamically draw a given two-dimensional trajectory in generally the same manner as explained above. In this case, the keys of the pitches "F", "E" and "D" are depressed with the middle finger, index finger and thumb, respectively. The performance guide indication is effected for the key of the pitch "C", to be subjected to "cross-over-fingering" rendition style operation, by sequentially controlling the illumination states of the LEDs of the LED groups 6Ba corresponding to the keys of the pitches "F", "E", "D#(E♭)", "D", "C#(D♭)" and "C". Namely, in this case, the end position of the performance guide indication for the most-recently-operated key of the pitch "D" is not in succession with the start position of the performance guide indication for the key of the pitch "C" to be next depressed, and the performance guide display is effected by dynamically drawing a given two-dimensional trajectory which, in accordance with the passage of time, moves upwardly away from the reference position corresponding to the key of the pitch "F", last operated with the middle finger be subjected to cross-over-fingering operation, toward the reference position corresponding to the key of the pitch "C" to be next depressed. Thus, the guiding trajectory, moving above the row of reference positions across the most-recently-operated key (more accurately, across the LED group 6Ba of the most-recently-operated key), can indicate, in a manner easy to visually follow, that the key depression operation is to be performed with a "cross-over-fingering" rendition style where the finger to be used for depressing the key to be next depressed should be caused to pass over the finger last used to depress the key of the pitch When a performance guide display is to be effected to instruct depression of keys, for example, in the pitch order of "E"→"D"→"C"→"D", as shown in FIG. 7C, arrow "4" represents a performance guide for "approach-fingering". To provide the performance guide for the keys of the pitches "E", "D" and "C" as represented by arrows "1", "2" and "3", the LED illumination states of the corresponding LED groups 6Ba are controlled so as to dynamically draw a given two-dimensional trajectory in generally the same manner as explained above. In this case, the keys of the pitches "E", "D" and "C" are depressed with the middle finger, index finger and thumb, respectively. The performance guide indication is effected for the key of the pitch "D", to be depressed with an "approach-fingering" rendition style, by sequentially controlling the illumination states of the LEDs of the LED groups 6Ba corresponding to the keys of the pitches "G", "F#(G♭)", "F", "E", "D#(E♭)" and "D". Namely, in this case, the end position of the performance guide indication for the most-recently-operated key of the pitch "C" is not in succession with the start position of the performance guide indication for the key of the pitch "D" to be next depressed, and the performance guide display is effected by dynamically drawing a given two-dimensional trajectory which, in accordance with the passage of time, moves upwardly away from the reference position corresponding to the key of the pitch "G", where the little finger to be subjected to "approach-fingering" operation may be generally positioned, toward the reference position corresponding to the key of the pitch "D" to be next depressed. Thus, the guiding trajectory, moving above the row of reference positions toward (not away from) the most-recently-operated key, can indicate, in a manner easy to visually follow, that the key depression operation is to be performed with an "approach-fingering" rendition style where the finger to be used for depressing the key to be next depressed should be caused to get closer to the most-recently-operated key.

Figure 8:
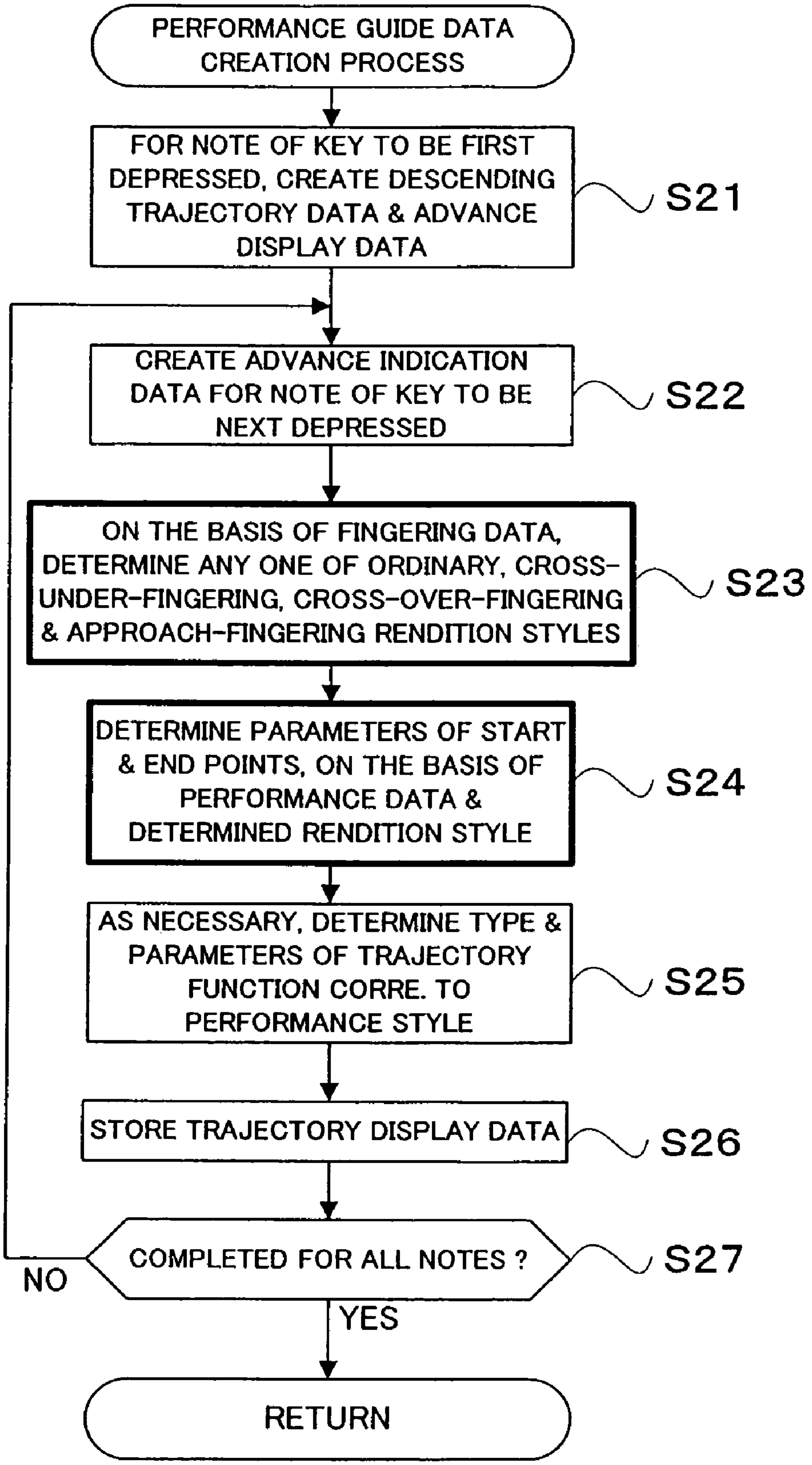
FIG. 8 is a flow chart showing another embodiment of the performance guide data creation process.

FIG. 8 is a flow chart showing another example of the "performance guide data creation process" carried out, in the above-described "performance guide data processing" (see step S2 of FIG. 4), to create not only performance guide data related to ordinary rendition styles but also performance guide data related to special rendition styles, such as cross-under-fingering, cross-over-fingering and approach-fingering rendition styles.

At step S21, trajectory display data representative of a descending trajectory and advance indication data are created and stored for the note of the key to be first depressed. A next step S22, advance indication data is created for the note of the key to be next depressed. At step S23, it is determined, on the basis of fingering data, which of ordinary, cross-under-fingering, cross-over-fingering and approach-fingering rendition styles is to be applied. Such a rendition style determination is made in accordance with rendition style determination rules to be explained below and on the basis of the fingering data that are, for example, included in the performance data or determined on the basis of the performance data. First, in the case of a right-hand performance, it is determined that the rendition style to be applied is "cross-under-fingering" if a note following a note to be performed with another finger than the thumb is higher in pitch than the above-mentioned note to be with another finger than the thumb. Second, it is determined that the rendition style to be applied is "cross-over-fingering" if a note following a note to be performed with the thumb is lower in pitch than the above-mentioned note to be performed with the thumb and is to be performed with another finger than the thumb. Third, it is determined that the rendition style to be applied is "approach-fingering" if a note following a note to be performed with the thumb is of a high pitch close to the pitch of the above-mentioned note to be performed with the thumb and is to be performed with a finger, such as the medicinal or little finger, remote from the thumb. The rendition style determination rules are not limited to the aforementioned. Further, the rendition style to be applied may be determined in any other suitable manner that is not based on particular rendition style determination rules. For example, data each indicative of a rendition style may be included in advance in the performance data, and the rendition style to be applied may be determined by referring to such rendition style data.

At step S24, respective parameters of the start and end point positions of a trajectory are determined on the basis of the performance data. If, for example, any one of cross-under-fingering, cross-over-fingering and approach-fingering rendition styles has been determined as the rendition style to be applied, the reference-position LED of the LED group 6Ba, corresponding to the key where the reference-position LED of at least one of the thumb, fixed finger and moving finger has already been placed, is illuminated in a predetermined display style a predetermined time (that may be either a fixed time or a time variable depending on the note length of the preceding note) before the performance timing of the key to be performed with the rendition style. Also, parameters of the trajectory start point and end point are determined such that a two-dimensional trajectory is drawn from the illuminated reference-position LED to the reference-position LED of the LED group 6Ba corresponding to the key to be depressed with the finger that should be cause to pass under or pass over another key to or approach the key to be next depressed. Note that, if the rendition style to be applied is an ordinary rendition style, the parameters of the start point and end point may be determined in the manner already explained above (see step S13 of FIG. 5). At step S25, the trajectory display data and advance indication data (i.e., performance guide data) created in the above-described manner are stored in memory. At following step S27, a determination is made as to whether the aforementioned operations have been completed for all of the notes included in the selected performance data file. If it is determined that the aforementioned operations have been completed for all of the notes in the selected performance data file (YES determination at step S27), the instant performance guide data creation process is brought to an end. If answered in the negative (NO determination at step S27), on the other hand, the process revert to step S22 to repeat the operations of steps S22-S27 above.

Figure 9A:
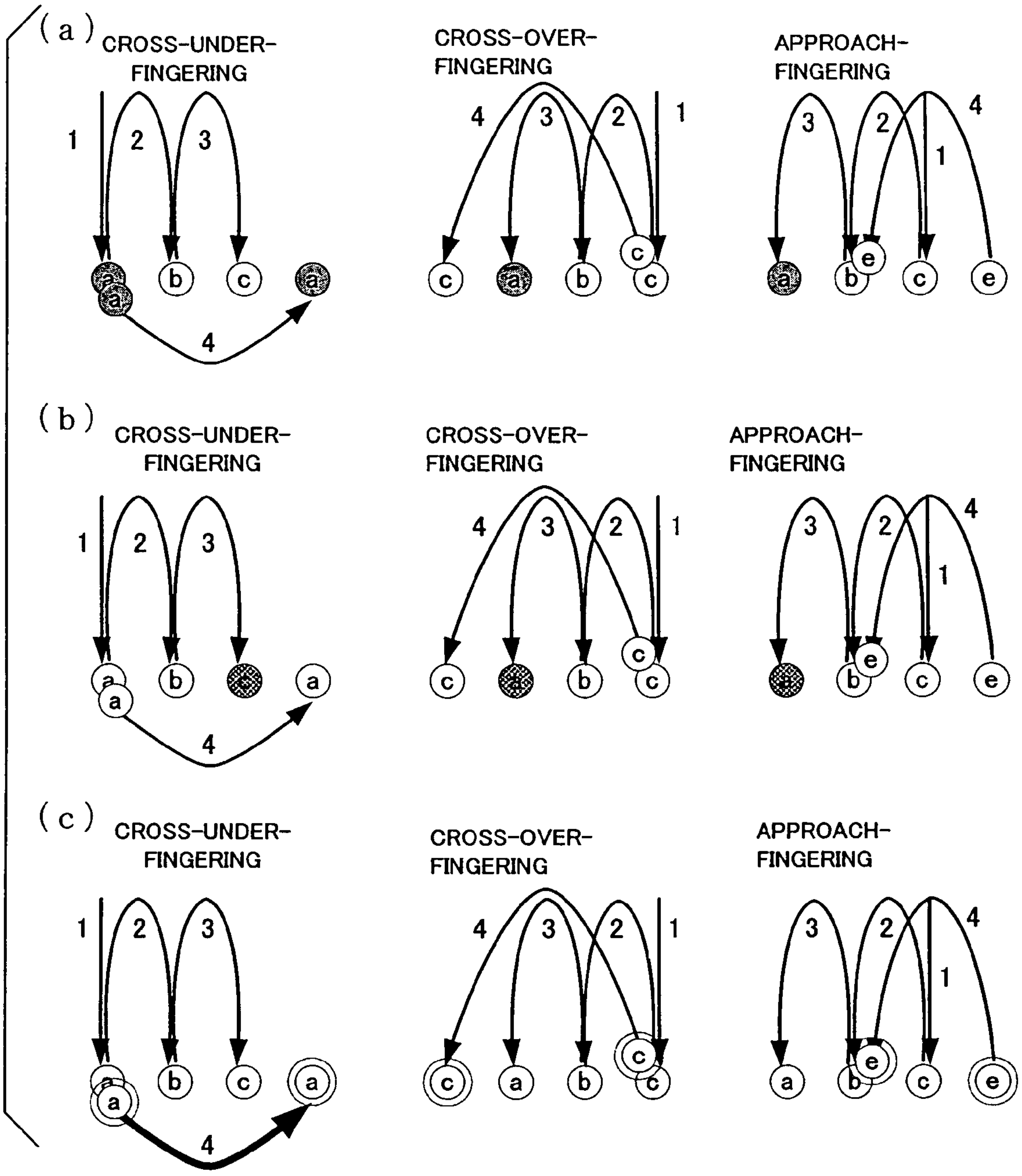
FIG. 9A is a conceptual diagram showing examples of guide displays related to special rendition styles.
Figure 9B:
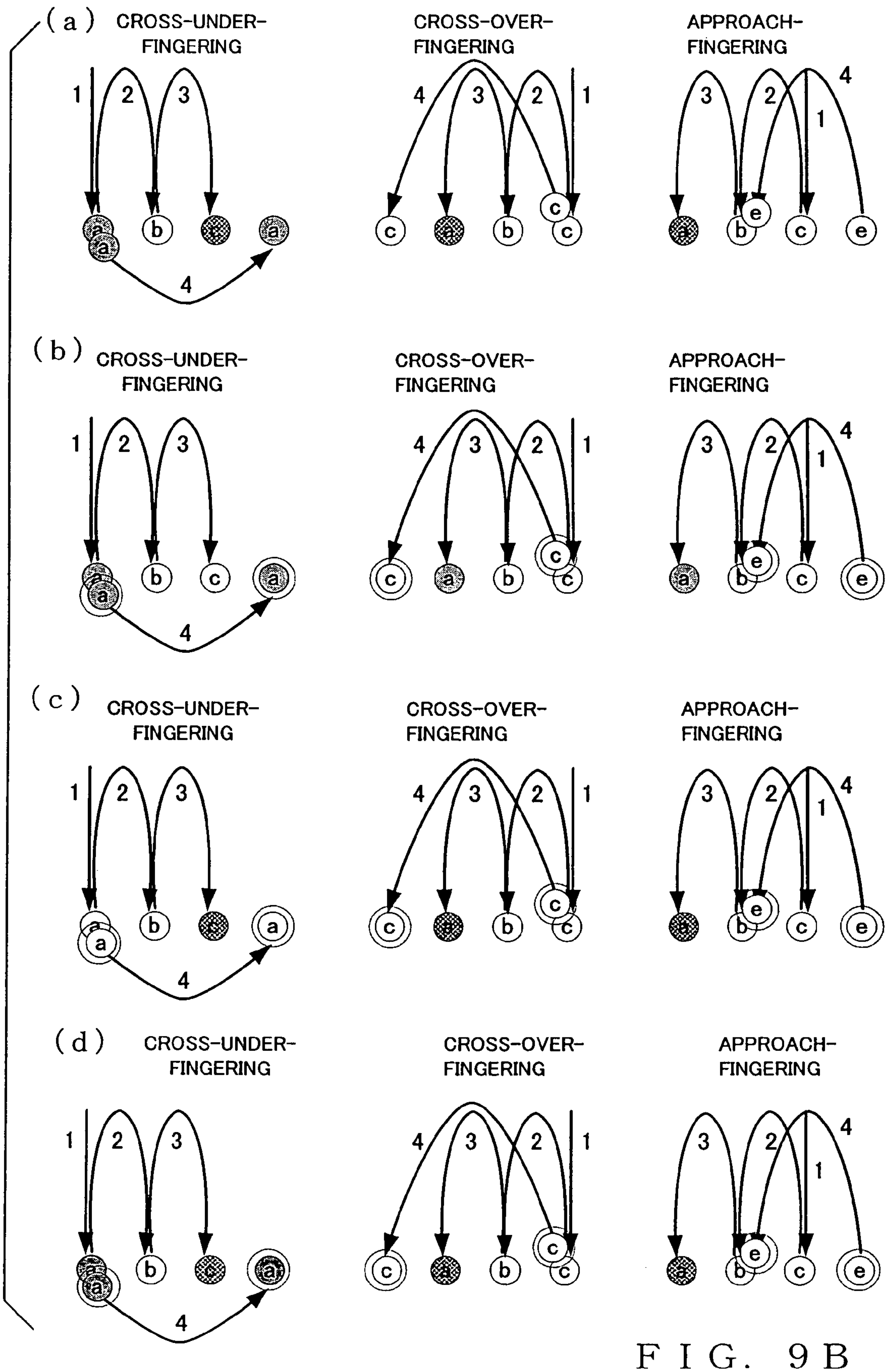
FIG. 9B is a conceptual diagram showing other examples of guide displays related to special rendition styles.

If an ordinary rendition style and special rendition style are guide-displayed in combination in the same display style, the human player might get confused, and hence, there is a need to appropriately modify the display style. Thus, FIGS. 9A and 9B illustratively show several specific examples of performance guide displays related to special rendition styles. Here, in these cases, prior to execution of the trajectory-based performance guide display related to a special rendition style (represented by arrow "4"), the reference finger, fixed finger and moving finger are displayed in different display styles from the other fingers, so as to permit distinction between the ordinary rendition style and the special rendition style. In each of the illustrated examples, the left area shows the display style for "cross-under-fingering" (see FIG. 7A), middle area the display style for "cross-over-fingering" (see FIG. 7B), and right area the display style for "approach-fingering" (see FIG. 7C). Lower-case English letters "a"-"e" represent the individual fingers. In the figures, each LED to be illuminated again, in accordance with predetermined performance timing, immediately following the preceding performance-guide illumination of the same LED (responsive to the preceding performance timing) is shown as positionally displaced from the position of the preceding illumination, for convenience of illustration.

Section (a) of FIG. 9A shows a case where the thumb set as the is displayed in a different display style from the other fingers; more specifically, the reference-position LED of the LED group 6Ba, corresponding to the key to be operated by the thumb a is illuminated in a different color (indicated by a filled circle in section (a)) from the reference-position LEDs of the LED groups 6Ba corresponding to the keys to be operated by the other fingers. Here, the "reference finger" is an attention-requiring characteristic finger in a performance guide and may be another finger than the thumb. Section (b) of FIG. 9A shows a case where the finger most recently used to operate a key (i.e., most-recently-manipulated finger) is set to serve as the fixed key and displayed in a different display style from the other fingers. More specifically, the most-recently-manipulated middle finger c is set to serve as the fixed key in the case of cross-under-fingering, and the most-recently-manipulated thumb a is set to serve as the fixed key in the case of cross-over-fingering or approach-fingering. The reference-position LED of the LED group 6Ba, corresponding to the key to be operated by the fixed key, is displayed in a different display style (indicated by a meshed half-tome circle in section (b)) from the reference-position LEDs of the LED groups 6Ba corresponding to the keys to be operated by the other fingers. Section (c) of FIG. 9A shows a case where any one of the fingers, to be manipulated with a special rendition style, is set to serve as the moving key and displayed in a different display style from the other fingers; more specifically, the thumb a is set to serve as the moving key in the case of cross-under-fingering, the middle finger c is set to serve as the moving key in the case of cross-over-fingering, and the little finger e is set to serve as the moving key in the case of approach-fingering. The reference-position LED of the LED group 6Ba, corresponding to the key having been most recently operated by the moving key, is displayed in a different display style (indicated as surrounded by a dotted-line circle in section (c)) from the reference-position LEDs of the LED groups 6Ba corresponding to the keys to be operated by the other fingers.

FIG. 9B shows cases where the display styles shown in FIG. 9A are used in suitable combinations. More specifically, section (a) of FIG. 9B shows a case where both the thumb (reference finger) and the fixed finger are displayed simultaneously in different display styles from the other fingers. More specifically, if the thumb a is not set to serve as both the reference key and the fixed key as seen in the "cross-under-fingering" area, the reference-position LEDs of the LED groups 6Ba, corresponding to the key to be operated by the thumb a and the key having been operated by the middle finger (fixed finger), are displayed in different display styles from the other fingers; in the illustrated example, the reference-position LEDs corresponding to the thumb and fixed finger are indicated by a filled circle and meshed half-tone circle, respectively. Section (b) of FIG. 9B shows a case where both the thumb (reference finger) and the moving finger are displayed simultaneously in different display styles from the other fingers. More specifically, depending on whether or not the thumb (reference finger) is set to serve as both the reference key and the moving key, the reference-position LEDs of the LED groups 6Ba, corresponding to either or both of the reference key and the moving key, are displayed in different display colors from the other fingers, as in the example of section (a) of FIG. 9B; in the illustrated example, the thumb is indicated by a filled circle, and the moving key is indicated as surrounded by a dotted-line circle. Section (c) of FIG. 9B shows a case where both the fixed finger and the moving finger are displayed simultaneously in different display styles from the other fingers. Because, in this case, the fixed finger is not set to serve also as the moving finger, the reference-position LEDs corresponding to the fixed finger and moving key are displayed in different styles from the other fingers; the fixed and moving fingers are indicated by a meshed half-tone circle and as surrounded by a dotted-line circle, respectively. Section (d) of FIG. 9B shows a case where the thumb (reference finger), fixed finger and moving finger are displayed simultaneously in different display styles from the other fingers. More specifically, depending on whether or not the thumb (reference finger) is set to serve also as the fixed or moving key, the reference-position LEDs of the LED groups 6Ba, corresponding to the keys in question, are displayed in different display colors from the other fingers, as in the example of section (a) or (b) of FIG. 9B; in the illustrated example, the thumb is indicated by a filled circle, the fixed finger is indicated by a meshed half-tone circuit, and the moving key is indicated as surrounded by a dotted-line circle.

The display styles for the thumb (reference finger), fixed finger and moving finger may be differentiated from the display style for the other fingers by displaying the reference-position LEDs of the LED groups 6Ba corresponding to the thumb (reference finger), fixed finger and moving finger in different brightness, blinking patterns or the like, rather than in different colors, from the reference-position LEDs of the LED groups 6Ba corresponding to the other keys. Needless to say, the display styles for the reference finger, fixed finger and moving finger are differentiated from one another.

Where one finger is to serve as two or more of the reference, fixed and moving fingers, it is preferable that these two or more fingers be displayed in a particular display style representing all of the types of the two or more fingers. For example, where one finger is to serve as the reference and moving fingers, that the one finger is the reference finger may be indicated in a different color, and that the one finger is also the moving finger may be indicated in a blinking pattern.

Needless to say, the given two-dimensional trajectory to provide a visual performance guide for any one of special rendition styles, such as cross-under-fingering, cross-over-fingering and approach-fingering, may be differentiated in display style from trajectories for ordinary rendition styles.

Namely, according to the second embodiment having been set forth above, at least one of special rendition styles, i.e. cross-under-fingering, cross-over-fingering and approach-fingering, is determined, the display style for the predetermined LED corresponding to the key to be operated, in the determined special rendition style, by at least one of the thumb (reference finger), fixed finger and moving finger is differentiated from the display style for the LEDs corresponding to the other keys to be operated in ordinary rendition styles, and the finger to be manipulated through cross-under-fingering, cross-over-fingering or approach-fingering is displayed by drawing a two-dimensional trajectory. Such arrangements can visually indicate, to the human player, not only ordinary rendition styles but also special rendition styles, such as cross-under-fingering, cross-over-fingering and approach-fingering, through performance guide displays.

Further, whereas the planar display section 6B employed in the instant embodiment has been described above as including LED groups, each comprising an array of a plurality of (e.g., 12) LEDs, provided in corresponding relation to the keys of the keyboard, the present invention is not so limited. For example, the planar display section 6B may include a plurality of arrays of LED groups 6Ba per key, or it may be in the form of a dot-matrix type LED display device, LCD display device or any other suitable type of display device. Needless to say, if a greater number of such display elements are provided in higher density on the display section 6B, a smoother trajectory display is permitted. Therefore, the planar display section 6B may be implemented by an LCD display device comprising, for example, a single large-size display panel. However, such a large-size display panel tends to be expensive although it permits a smoother trajectory display, the construction of the planar display section 6B as described above in relation to the preferred embodiment is more advantageous because of its low cost.

Note that the above-mentioned LED groups 6Ba etc. may be incorporated in the interior of individual keyboard keys that are each formed of a translucent material, so as to effect a performance guide display by the respective bodies of the keys.

Furthermore, the format of the trajectory display data is not limited to the above-described format where combinations of the start point position and shift start timing and the end point position and shift end timing, types and parameters of the trajectory function are stored in corresponding relation to the notes of the music piece in question. Further, the trajectory display data to provide a visual performance guide need not necessarily be created for all of the notes prior to reproduction of the performance data; instead, the trajectory display data to provide a visual performance guide may be created, during reproduction of the performance data, on the basis of performance data having been read out in advance (i.e., pre-read) little by little.

Furthermore, it is preferable that illumination and deillumination of the individual LEDs be controlled to provide a performance guide display with an "afterimage" of a preceding trajectory.

Furthermore, whereas the preferred embodiment has been described above as illuminating the lowermost LED of the LED group 6Ba close to each key to be depressed, any other suitable LED located higher than the lowermost LED in the LED group 6Ba may be illuminated to indicate the key to be depressed.

Note that the second embodiment may be arranged to display any one or two, not all, of the cross-under-fingering, cross-over-fingering and approach-fingering rendition styles. Where more than one of the cross-under-fingering, cross-over-fingering and approach-fingering rendition styles can be guide-displayed, the embodiment may be arranged to allow the human player to select one or two of the displayable special rendition styles; namely, the human player can make a selection such that no visual guide display is effected for any one of the special rendition styles. If the cross-under-fingering rendition style is not guide-displayed, the lowermost LED, instead of the intermediate LED, of the LED group 6Ba may be illuminated as the reference-position LED in accordance with the performance timing.

The second embodiment may be arranged to display any one or two of the thumb (reference finger), fixed finger and moving finger, instead of displaying all of these fingers. Where more than one of the thumb (reference finger), fixed finger and moving finger can be displayed, the embodiment may be arranged to allow the human player to select one or two of these displayable fingers; namely, the human player can make a selection such that no visual guide display is effected for any one of the finger types. Further, the second embodiment may be arranged to allow the human player to set desired display styles of the individual finger types.

What is claimed is:

1. A performance guide apparatus comprising:

a performance operation section including a plurality of performance operators;

a two-dimensional display section provided near said performance operation section;

an acquisition section that acquires performance data; and a display control section that, in accordance with the performance data acquired by said acquisition section, controls said two-dimensional display section so as to indicate each of the performance operators to be operated in accordance with a progression of a performance, wherein, in accordance with a passage of time, said display control section causes said two-dimensional display section to display a moving two-dimensional trajectory, from a first display position corresponding to one of the performance operators to be currently operated to a second display position corresponding to another one of the performance operators to be operated next, wherein said display control section controls said two-dimensional display section to display the moving two-dimensional trajectory in a display style variably controlled in accordance with performance-related information pertaining to at least one of the performance operator to be currently operated or the performance operator to be operated next, and wherein the variably-controlled display style variably controls a height of a bounce peak point of the two-dimensional trajectory representative of bouncing movement.

2. A performance guide apparatus comprising:

a performance operation section including a plurality of performance operators;

a two-dimensional display section provided near said performance operation section;

an acquisition section that acquires performance data;: and a display control section that, in accordance with the performance data acquired by said acquisition section, controls said two-dimensional display section so as to indicate each of the performance operators to be operated in accordance with a progression of a performance, wherein, in accordance with a passage of time, said display control section causes said two-dimensional display section to display a moving two-dimensional trajectory, from a first display position corresponding to one of the performance operators to be currently operated to a second display position corresponding to another one of the performance operators to be operated next, wherein said display control section controls said two-dimensional display section to display the moving two-dimensional trajectory in a display style variably controlled in accordance with performance-related information pertaining to at least one of the performance operator to be currently operated or the performance operator to be operated next, and wherein the variably-controlled display style variably controls a height of a bounce-landing point of the moving two-dimensional trajectory representative of bouncing movement.

* * * * *